United States Patent
Weinstein et al.

(10) Patent No.: US 8,465,272 B2
(45) Date of Patent: Jun. 18, 2013

(54) APPARATUS AND METHODS FOR FABRICATING FOOD ITEMS

(75) Inventors: James N. Weinstein, Maple Grove, MN (US); James M. Olive, St. Paul, MN (US); Peter A. Huberg, Shoreview, MN (US); Laurie Burgess, Maple Grove, MN (US); Thomas Leuhrs, Rogers, MN (US); Jennifer M. Mcaab, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 882 days.

(21) Appl. No.: 12/373,035

(22) PCT Filed: Sep. 28, 2007

(86) PCT No.: PCT/US2007/079837
§ 371 (c)(1),
(2), (4) Date: Oct. 20, 2009

(87) PCT Pub. No.: WO2008/042750
PCT Pub. Date: Apr. 10, 2008

(65) Prior Publication Data
US 2010/0055274 A1     Mar. 4, 2010

Related U.S. Application Data

(60) Provisional application No. 60/827,575, filed on Sep. 29, 2006.

(51) Int. Cl.
*B29C 47/12* (2006.01)
*A23P 1/12* (2006.01)

(52) U.S. Cl.
USPC ............. 425/133.1; 425/381; 425/382 R; 425/462; 425/463

(58) Field of Classification Search
USPC ............ 425/133.1, 381, 382 R, 382.3, 382.4, 425/462, 463
See application file for complete search history.

(56) References Cited

U.S. PATENT DOCUMENTS

| | | | | |
|---|---|---|---|---|
| 718,379 | A * | 1/1903 | Painter | 425/393 |
| 4,208,175 | A * | 6/1980 | Rosenbaum | 425/131.1 |
| 4,445,838 | A * | 5/1984 | Groff | 425/319 |
| 4,859,165 | A * | 8/1989 | Hoashi | 425/133.1 |
| 5,137,675 | A * | 8/1992 | Rabe | 264/173.17 |

(Continued)

FOREIGN PATENT DOCUMENTS

EP     534208     * 3/1993

*Primary Examiner* — Joseph Del Sole
*Assistant Examiner* — Seyed Masoud Malekzadeh
(74) *Attorney, Agent, or Firm* — Everett G. Diederiks, Jr.; Gregory P. Kaihoi (57) ABSTRACT

Apparatus and methods for fabricating food items include extruding a first hot plastic food mass through multiple passages (14) and co-extruding a second hot plastic food mass through a feed stem (22) received in each of the multiple passages (14) and through nozzles (42). Each nozzle (42) includes a first portion (42b) in communication with the feed stem (22) but not the passage (14) and a second portion (42a) in communication with the passage (16) but not the feed stem (22). The nozzles (42) are rotatable in gearing relation with the drive gear (70) of a servomotor (72). The co-extruded ropes are conveyed at a linear speed rate less than or equal to the discharge speed from the nozzles (42), cooled, and cut into individual pieces in the form of peelably separable strands.

17 Claims, 4 Drawing Sheets

U.S. PATENT DOCUMENTS

| | | | |
|---|---|---|---|
| 5,232,751 A * | 8/1993 | Cameron et al. | 428/15 |
| 5,318,417 A * | 6/1994 | Kopp et al. | 425/97 |
| 5,324,187 A * | 6/1994 | Cook | 425/131.1 |
| 5,375,990 A * | 12/1994 | Krupa et al. | 425/133.5 |
| 5,616,350 A * | 4/1997 | Wissmann et al. | 425/133.1 |
| 5,804,222 A * | 9/1998 | Brown et al. | 425/113 |
| 5,840,354 A | 11/1998 | Benham et al. | |
| 5,935,613 A | 8/1999 | Benham et al. | |
| 5,955,116 A * | 9/1999 | Kehoe et al. | 425/131.1 |
| 5,958,485 A | 9/1999 | Benham et al. | |
| 6,190,717 B1 | 2/2001 | Benham et al. | |
| 6,443,055 B1 | 9/2002 | Hashimoto | |
| 6,450,796 B1 * | 9/2002 | Groff et al. | 425/192 R |
| 6,458,405 B1 | 10/2002 | Roy et al. | |
| 6,565,900 B2 | 5/2003 | Roussel et al. | |
| 6,626,660 B1 * | 9/2003 | Olson et al. | 425/190 |
| 6,712,595 B2 * | 3/2004 | Horna et al. | 425/133.1 |
| 6,793,474 B2 * | 9/2004 | Groeblacher et al. | 425/131.1 |
| 6,805,543 B2 | 10/2004 | Fux et al. | |
| 7,153,119 B2 | 12/2006 | Hashimoto et al. | |
| 7,247,012 B2 * | 7/2007 | Anand et al. | 425/131.1 |
| 7,357,890 B2 * | 4/2008 | Pritchett et al. | 264/209.2 |
| 2002/0076461 A1 * | 6/2002 | Schmidt et al. | 425/131.1 |
| 2002/0109258 A1 * | 8/2002 | Groeblacher et al. | 264/173.16 |
| 2003/0077347 A1 | 4/2003 | Miebach | |
| 2003/0111762 A1 * | 6/2003 | Floyd et al. | 264/136 |
| 2003/0215552 A1 * | 11/2003 | Hashimoto et al. | 426/523 |
| 2005/0260408 A1 * | 11/2005 | Anand et al. | 428/364 |
| 2005/0275131 A1 * | 12/2005 | Hoium et al. | 264/173.17 |
| 2008/0038416 A1 | 2/2008 | Burgess et al. | |

\* cited by examiner

APPARATUS AND METHODS FOR FABRICATING FOOD ITEMS

CROSS-REFERENCE TO RELATED APPLICATIONS

This application represents a National Stage application of PCT/US2007/079837 entitled "Apparatus and Methods for Fabricating Food Items" filed Sep. 28, 2007, which claims the benefit of U.S. Provisional Patent Application Ser. No. 60/827,575 filed Sep. 29, 2006.

BACKGROUND

The present invention generally relates to apparatus and methods for fabricating food items, and particularly to apparatus and methods for fabricating food items including food of a desired shape (which could be supported on a support material) and to the food items which can be produced by such apparatus and methods.

The sale of snack-type food products is a highly competitive business. In addition to the particular food components, increasingly the novelty and play value of the product are important in the marketability of any particular food item. For example, fruit-based snack products such as FRUIT ROLL-UPS™ and FRUIT-BY-THE-FOOT™ fruit products have found wide market acceptance.

Based upon that market acceptance, various techniques have been developed to create fruit-based food items of different shapes and configurations. Examples of such techniques are described in at least U.S. Pat. Nos. 5,935,613; 5,958,485; and 6,190,717. However, it can be appreciated that if food items of different shapes and/or configurations are desired to be produced, it is generally necessary to change dies, embossers, or other forming components of the apparatus which create the shape and/or configuration of the food items, with such changeover resulting in capital costs and downtime labor and lost profits.

Thus, a need continues to exist for apparatus and methods for fabricating food items having novelty and increased play value over prior food items which allow variation in the creation of different food items without encountering changeover problems, which increase productivity from the standpoint of increased rate of production and of minimizing cleaning maintenance and repair necessities, and which otherwise overcome the deficiencies and shortcomings of the prior art.

SUMMARY

The present invention solves this need and other problems in the field of food item fabrication by coextruding, in the preferred form, a hot plastic food mass having a temperature of 49° to 100° C. and having a viscosity exceeding 500,000 centipoise to form a first extrudate rope at a first linear discharge speed and at least a second extrudate rope at a second linear discharge speed to form a co-extruded rope at a temperature of 80° C. or greater. The co-extruded rope is received onto a take-away conveyor having a linear speed rate of equal to or less than the lower of the first and second extrudate linear discharge speeds so that the co-extruded rope is not stretched. The co-extruded rope is quiescently cooled to 80° C. or less to form a cooled set co-extruded extrudate rope. The cooled set co-extruded rope is cut to form individual pieces in a form of peelably separable strands.

In a first aspect of the present invention, food item fabrication is preformed in a co-extrusion apparatus including a manifold having a front face, a rear face, and at least one through passage extending from the rear face to the front face. A feed stem is slideably received in each of the through passages, with the feed stem including a sealing portion of a size and shape corresponding to and for slideable and sealing receipt in the through passage. The feed stem further includes a feed portion extending from the sealing portion and of a size less than the through passage, with a central bore extending through the feed stem. A passageway is defined between the feed portion and the through passage. A nozzle closes the central bore and the passageway. The nozzle includes a first nozzle portion in communication with the central bore but not with the passageway. The nozzle also includes a second nozzle portion in communication with the passageway but not with the central bore.

In a further aspect of the present invention, food item fabrication is performed in an extrusion apparatus including a manifold having a front face, a rear face, and multiple passages extending to the front face. Each of the passages includes an outer stem secured to the front face of the manifold, with the outer stem having a central conduit of a size and shape corresponding to the passage. A drive element is rotatably mounted upon the outer stem. A nozzle is mounted upon the drive element and closes the central bore. A rotatable power source includes a rotatable shaft, with the drive elements of the multiple passages being in driving relation with the rotatable shaft.

In a still further aspect of the present invention, food item fabrication is performed in an extrusion apparatus including a manifold having a front face, a rear face, and at least one passage extending to the front face. A nozzle closes the passage. A drive element is mounted to the manifold with the passage extending therethrough. The nozzle is removably mounted to the element, with at least one lug extending from one of the element and the nozzle. An L-shaped slot slideably receives the lug extending from a free end of the other of the element and the nozzle. The L-shaped slot includes an axially extending portion extending from the free end and interconnects at an interconnection with a circumferentially extending portion.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "lower", "upper", "end", "axial", "top", "front", "rear", "bottom", "width", "height", and similar terms are used herein, it should be understood that these terms have reference only to the structure shown in the drawings as it would appear to a person viewing the drawings and are utilized only to facilitate describing the invention.

Throughout the specification and claims, percentages are by weight and temperatures in degrees Fahrenheit unless otherwise indicated. Each of the referenced patents and patent applications are incorporated herein by reference.

DESCRIPTION

An apparatus utilizing methods for fabricating a food item according to the preferred teachings of the present invention is shown in the drawings and generally designated 10. Generally, apparatus 10 includes a manifold 12 having multiple through passages 14 arranged in the preferred form in a spaced, horizontal, linearly straight manner. Although the arrangement is believed to produce synergistic results, the number and arrangement of through passages 14 could be varied according to the teachings of the present invention. In the form shown, each through passage 14 includes a counter bore 16 of a size larger than passage 14 and extending from the rear face of manifold 12. Manifold 12 further includes a mounting plate 18 suitably secured to abut with the front face of manifold 12. Mounting plate 18 includes multiple threaded openings 20 at locations and shapes corresponding to but of a size slightly larger than passages 14. Although separately formed for ease of fabrication, mounting plate 18 could be integrally formed with manifold 12 as a single component.

A feed stem 22 is slideably received in each of passages 14 and extends through opening 20 beyond mounting plate 18. Each feed stem 22 includes a first, end portion 22a of a size and shape corresponding to and for slideable receipt in counter bore 16. In the preferred form, portion 22a can be suitably secured in counter bore 16 such as by cap screws as shown. Each feed stem 22 includes an intermediate, sealing portion 22b of a size and shape corresponding to and for slideable receipt in passage 14 and of a size smaller than portion 22a. Portion 22b is suitably sealed inside of passage 14 such as by O-rings received in grooves formed in portion 22b as shown. Each feed stem 22 further includes a feed portion 22c of a size less than passage 14 and portion 22b, with portion 22b located intermediate portions 22a and 22c. A central bore 24 extends from the free end of feed portion 22c through feed portion 22c and into feed portion 22b but spaced from portion 22a, with central bore 24 having circular cross sections in the most preferred form.

An element shown in the preferred form as being driven and in the most preferred form of a gear 26 is provided concentrically around each feed stem 22 outwardly of mounting plate 18. Gears 26 are in gearing relation with each other, such as that the first gear 26 is in gearing contact with the second gear 26, the second gear 26 is in gearing contact with the first and third gears 26, and so on. It can be appreciated that in such an arrangement with gears 26 of the same size, adjacent gears 26 will rotate in opposite directions at the same rotational speeds. However, other gearing relations can be utilized such as by the use of idler gears, the use of gears 26 of different diameters, and/or the like. Furthermore, drive elements can take other forms than shown such as pulley and belt assemblies or the like which will be within the skill of persons skilled in the art. In the preferred form, each gear 26 includes an axially extending collar 27 having a plurality of circumferentially spaced, rectangular-shaped lugs 27 formed thereon.

Apparatus 10 shown in the preferred form further includes multiple, outer stems 30 each having a threaded end 32 threaded into threaded openings 20. Thus, each outer stem 30 is thereby secured to the front face of manifold 12. A shoulder 34 is formed on the outer surface of each outer stem 30 opposite to threaded end 32. A bearing 36 sandwiched between shoulder 34 and mounting plate 18 rotatably supports one of the gears 26 upon the outer surface of outer stem 30. A central conduit 38 is formed within stem 30 of a size generally equal to passage 14 at its inner end and which flares to a greater size at its outer end in the preferred form. Conduit 38 is of a size larger than feed portion 22c of feed stem 22 and in the most preferred form is concentrically outward thereof.

Apparatus 10 further includes multiple nozzle caps 42 each rotated relative to manifold 12 and including a cylindrical portion 42a having a circular end 42b. Cylindrical portion 42a is of a size and shape for slideable receipt upon collar 27 of gear 26. Cylindrical portion 42a includes multiple L-shaped slots 44 each having an axially extending portion 44a extending from the free end of cylindrical portion 42a towards but spaced from circular end 42b. Portion 44a interconnects with circumferentially extending portion 44b axially spaced from the free end and circular end 42b of cylindrical portion 42a. An axially extending obtrusion 44c is provided at the interconnection of portions 44a and 44b at the edge of portion 44b adjacent the free end. An O-ring 46 is provided on collar 27 for abutment by the free end of cylindrical portion 42a.

Circular end 42b includes a first nozzle portion 50 adjacent the axial center and of a size and location corresponding to and for abutment with the free end of feed portion 22c of feed stem 22. Thus, first nozzle portion 50 is in communication with central bore 24 but not with the passageway defined between central conduit 38 and feed portion 22c in the preferred form. Circular end 42b further includes a second nozzle portion 52 located concentrically around first nozzle portion 50 and of a size and location corresponding to and for abutment with the free end of outer stem 30. Thus, second nozzle portion 52 is in communication with the passageway defined between central conduit 38 and feed portion 22c in the preferred form but not with central bore 24. Each of nozzle portions 50 and 52 includes extrusion ports of any desired shape, size, or configuration. It should be appreciated that nozzle portions 52 and/or 50 can be formed integrally as a single component with circular end 42b or can be formed separately from circular end 42b and suitably secured thereto in either a removable or irremovable manner. In alternate embodiments, nozzle portion 52 and circular end 42b is rotatable relative to nozzle portion 50 which is suitably fixed in relation to feed stem 22. Furthermore, the extrusion ports of nozzle portions 50 and 52 can be the same or different in the same nozzle cap 42 or between nozzle caps 42. As an example, extrusion ports of nozzle portion 50 could be shaped to incorporate ridges in the extrudate ropes to assist with peelability or separability of the extrudate ropes in the fabricated food items. Peelability is increased by reducing the area of contact between the extrudate ropes.

In assembly, bearing 36 within gear 26 is initially positioned on outer stem 30 which is then threaded into opening 20. Nozzle cap 42 is positioned on outer stem 30 with portions 44a aligned with and slid onto lugs 27. Nozzle cap 42 is moved axially to compress O-ring 46 until lugs 27 are aligned with portion 44b and located beyond obtrusion 44c. At that time, nozzle cap 42 is rotated relative to outer stem 30 until lugs 27 are located in portion 44b beyond obtrusion 44c. Pressure can be released on nozzle cap 42, with O-ring 46 biasing cap 42 away from plate 18 such that circumferential movement of lugs 27 is stopped by abutment with the ends of portions 44b and obtrusions 44c. Nozzle portions 50 and 52 abut against stems 22 and 30. To disassemble such as for cleaning, the above steps can simply be reversed. Furthermore, according to the teachings of the present invention, nozzle caps 42 are prevented from coming loose during operation as the result of a high speed forward and backward rotation.

Suitable provisions are included to provide a first food to central bore 24 of feed stem 22 and a second food to passage 14, both inside of manifold 12. In the most preferred form, the first and second foods are different from each other such as by color, composition, or the like. The first and second foods are a fruit-based material and in the most preferred form are in the form of a composition including a fruit base such as grape juice or pear concentrate and a gum system. In the most preferred form, fruit puree is absent from the composition.

Particularly, in the preferred form, apparatus 10 includes first and second pumps 56a and 56b mounted to the top and bottom faces of manifold 12, respectively. In the most preferred form, pumps 56a and 56b are planetary gear pumps allowing metering of flow of the first and second foods to multiple outlets from common sources and regardless of downstream pressures. Furthermore, pumps 56a and 56b are high pressure pumps able to pump highly viscous material of 500,000 CP or higher and in the most preferred form in the order of 1,000,000 CP such as fruit-based material through extrusion ports of nozzle portions 50 and 52 having a linear size in the order of 2 to 3 mm. In this regard, it is desirable that the linear size of the extrusion ports be minimized to allow extrusion of more intricate patterns, and it is anticipated that linear sizes of extrusion ports of 1 mm or smaller are possible.

In the most preferred form, manifold 12 includes first and second pump inlet conduits 58 having an outlet in the top and bottom faces of manifold 12, respectively, and an inlet in fluid communication with bores 60 formed in mounting plate 62 suitably secured to abut with the rear face of manifold 12. Although separately formed for ease of fabrication, mounting plate 62 could be integrally formed with manifold 12 as a single component. Further, manifold 12 further includes first and second sets of multiple pump outlet conduits 64 of a number corresponding to the number of through passages 14. Each conduit 64 has an inlet in the top or bottom faces of manifold 12, respectively. The first and second sets of multiple pump outlet conduits 64 have an outlet in communication with passage 14 adjacent to feed portion 22c or with central bore 24, respectively. Pumps 56a and 56b are suitably driven such as by electric servomotors.

Figure 1:
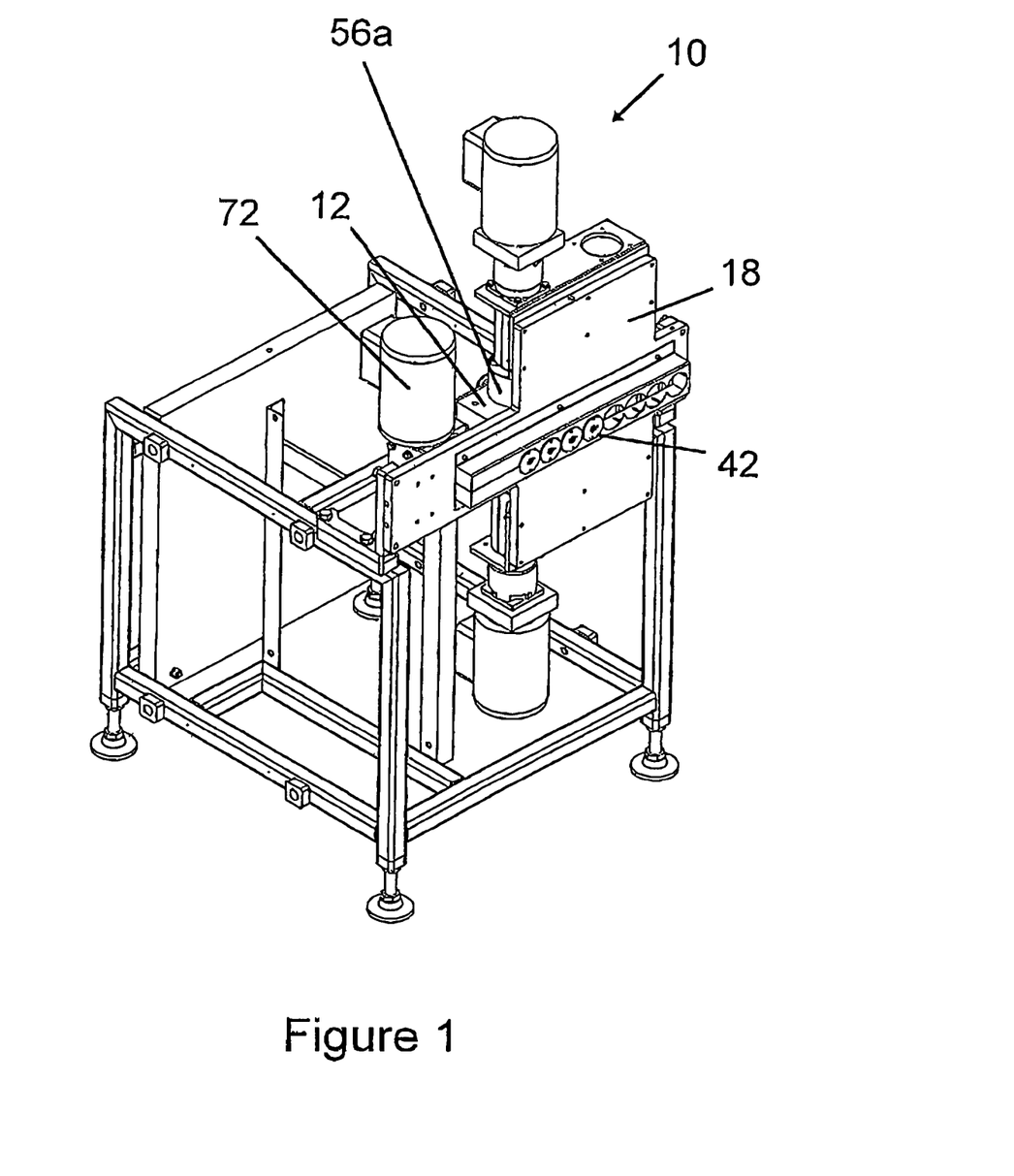
FIG. 1 shows a perspective view of an apparatus for fabricating a food item according to the preferred teachings of the present invention.
Figure 2:
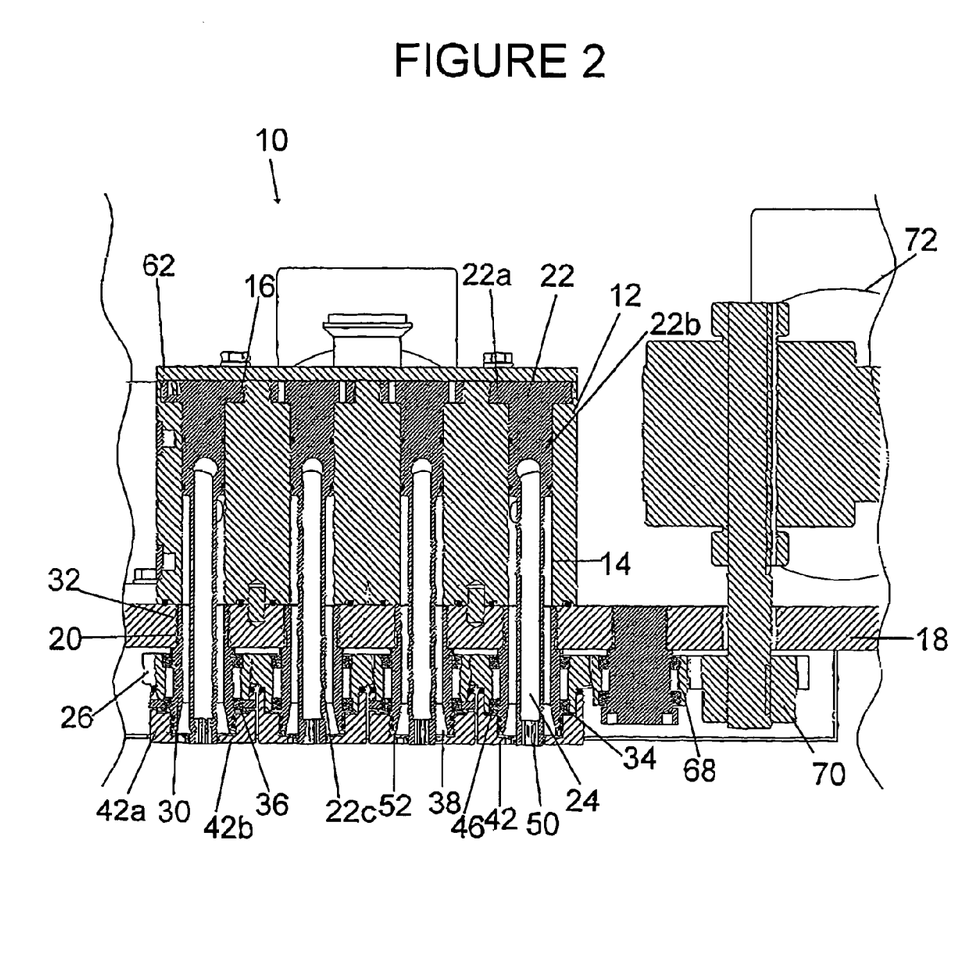
FIG. 2 shows a cross-sectional view of the apparatus of FIG. 1 according to section line 2-2 of FIG. 1.
Figure 3:
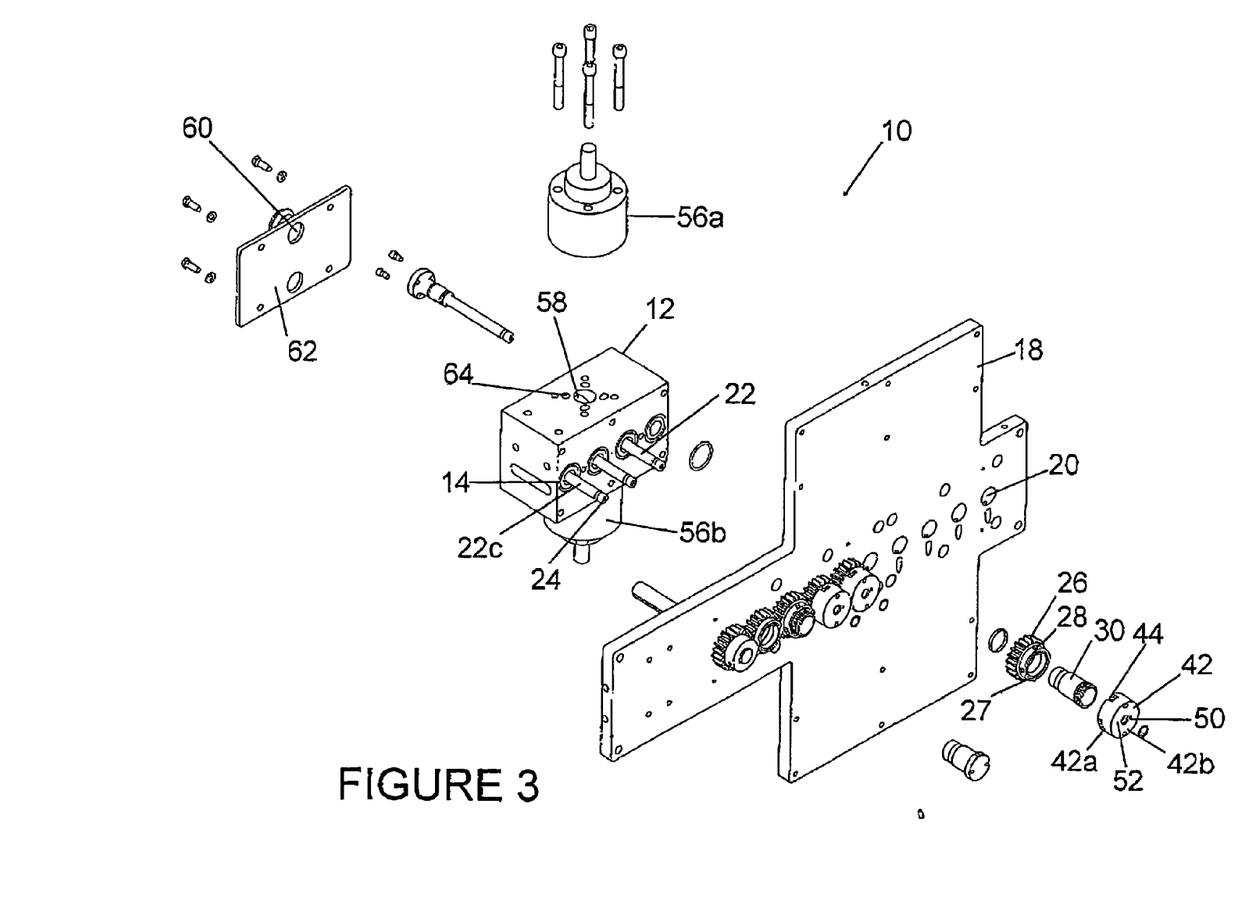
FIG. 3 shows an exploded, perspective view of the apparatus of FIG. 1.
Figure 4:
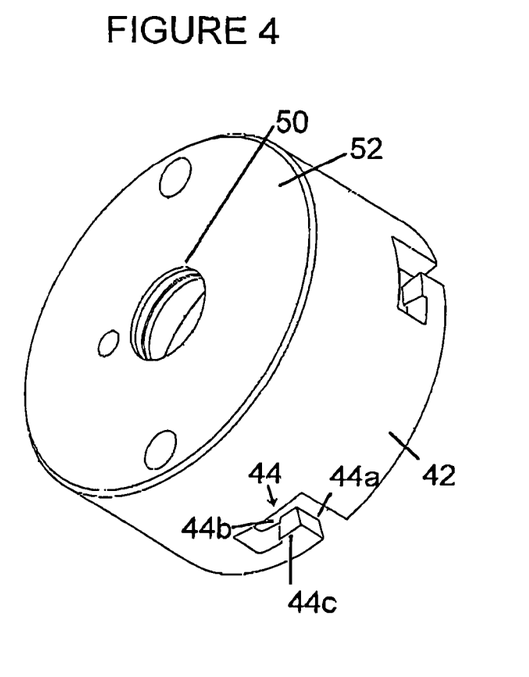
FIG. 4 shows a perspective view of a nozzle cap of the apparatus of FIG. 1.

Gears 26 are suitably rotated such as by an idler 68 in gearing relation with a first gear 26 and a drive gear 70 of a motor, servomotor or the like 72. In the form shown in FIG. 1, each pair of pumps 55a and 56b provide flow to four nozzle caps 42, and manifold 12 is shown as including four additional passages 14 to repeat the assemblage shown. In the most preferred form, the assemblage included in apparatus 10 can be ganged together in a linear manner, with the last gear 26 associated with the four nozzle caps 42 in gearing relation to the first gear 26 associated with the next set of four nozzle caps 42 such that motor 72 can drive all eight nozzle caps 42. However, it can be appreciated that apparatus 10 according to the teachings of the present invention can associate pumps 56a and 56b with fewer or greater number of passages 14 than four as shown, that nozzle caps 42 can be driven individually or in different sets, and that motor 72 could be utilized for additional apparatus 10.

Now that the basic construction of apparatus 10 according to the preferred teachings of the present invention has been explained, methods for fabricating a food item utilizing apparatus 10 according to the teachings of the present invention and further features and advantages of the present invention can be set forth and appreciated. In particular, first and second foods are provided to bores 60 of mounting plates 62 and thereby to conduits 58.

Suitable for use herein, for example, as the foods are intermediate moisture food pastes especially fruit and/or confectionery paste. Especially suitable for use herein as the food paste are intermediate moisture (i.e., having a water activity of 0.75 or less, preferably about 0.45-0.6) sweetened fruit compositions such as compositions that are described, for example, in U.S. Pat. No. 5,840,354 "DRIED FRUIT PRODUCTS FORTIFIED WITH CALCIUM AND METHOD OF PREPARATION" (issued Nov. 24, 1998 to Baumann et al.). The fruit paste compositions therein described in detail include intermediate moisture sweetened fruit compositions fortified with calcium supplied by calcium phosphate. The fruit compositions comprise: A) about 5 to 65% by weight of fruit solids; B) about 0.1 to 85% of carbohydrates; C) about 180 to 1500 mg/oz total calcium; and D) about 9 to 20% moisture. While the '354 patent is directed in particular to calcium fortified fruit paste compositions, both calcium fortified and unfortified compositions can be used herein. Optionally, such compositions can include 0.5%-5% of a fat or oil ingredient in addition to minor levels of adjuvants such as flavors, colors minerals, vitamins, and/or nutriceuticals. Also useful herein are those compositions described in U.S. Ser. No. 11/272,764 "ROD AND COIL SHAPED FOOD PRODUCT AND METHOD OF PREPARATION" (filed Nov. 15, 2005 to Laurie Burgess et al.).

Preferably, the foods are shear thinning semi-solids that are pumpable under extrusion conditions described herein yet form solids when cooled to room temperatures. In preferred form, such solid shapes are nonetheless pliable or flexible at room temperature rather than forming a hard or glassy solid. In even more preferred form, the food compositions comprise 85-90% total solids and include about 0.1-1% carrageenan as a principle added gelling or structuring agent. In more preferred form, the carrageenan is a blend of a major portion of kappa carrageenan and a minor portion of iota carrageenan. In such preferred form, the food compositions are starch and flour free (i.e., 1% or less, preferably 0% starch or flour). In one particular embodiment, the ratio of kappa carrageenan to iota carrageenan ranges from about 2:1 to about 3:1.

First and second foods are provided from a suitable supply system to the present apparatus at a temperature in the order of 120° to 212° F. (49° to 100° C.), preferably in the order of 160° to 200° F. (71 to 93° C.) and most preferably of 160° to 180° F. (71° to 82° C.) and at high viscosity, for example, exceeding 500,000 CP and most preferably in the order of 1,000,000 CP. First and second foods are pumped by pumps 56a and 56b from conduits 58 into each of conduits 64 under pressures in the order of 150 to 400 psi (1040–2760 kPa) and most preferably in the order of 150 to 200 psi (1040-1380 kPA). From conduits 64, first and second foods flow into through passage 14 and central bore 24 and then through extrusion ports of nozzle portions 52 and 50, respectively.

In a preferred form, first and second foods are extruded through the extrusion ports as multiple single extrudate ropes each having a cross section corresponding to the cross sectional shape of the extrusion port from which it is being extruded, i.e., without expansion or stretching. In the most preferred form, the extrudate ropes are extruded onto a conveyor extending through a cooling tunnel and further processing steps including, but not limited to, optionally placement upon support material for handling and packaging purposes, cutting and packaging. In more preferred form, the extrudate ropes are extruded at extrusion rates and conveyor take-away lines operated at approximately equal linear speeds such as to minimize stretching of the ropes upon extrusion. While not wishing to be bound to any theory of operation, it is believed that the absence of such stretching of the extrudate ropes when extruded under the described conditions herein results in improved peelability of the multiple strands from one another upon cooling of the finished product. In contrast, conventional licorice multi-strand product production typically involves not only flour or starch bearing confection formulations but also stretching of the extrudate prior to cooling which can reduce the tendency of the strand to peel from each other without tearing. In another variation, the take away conveyor is operated at a take away speed slightly less than the extrudate speed to slightly bunch the ropes onto the conveyor. In one particular embodiment, each rope is extruded at the rate of about 2-4 cc/sec.

In more preferred form, the ropes are extruded directly onto the conveyor (i.e., the finished articles do not include a support layer or paperboard element). The extrudates are generally extruded at temperatures of 80° C. or higher so as to be above the gel set point temperature of the carrageenan (at the described solids content above) ingredient. The extruded ropes are allowed to cool quiescently (e.g., without stretching or cutting) for times sufficient to cool to allow for the carrageenan to set to form a solid structure. Since space is typically at a premium in a production facility, cooling can be accelerated by running the ropes on the conveyor through a cooling tunnel with forced chilled air.

Once cooled enough to section into pieces, the ropes can be cut into individual pieces (e.g. having a length ranging from about 75-150 cm, preferably about 90-130 cm). The pieces can then be packaged into suitable packaging. For example, the pieces can be packaged within pouches fabricated from moisture loss resistant flexible packaging film. The pieces can be packaged when at room temperature or while even still warm, e.g., 50-80° C. In preferred commercial practice, the pieces are packaged while still warm (e.g., 50-60° C.) and allowed to cool within the sealed pouch.

It should be appreciated a variety of different food items can be fabricated utilizing apparatus 10 according to the teachings of the present invention. In particular, different first and second foods can be utilized in combination. Different shaped extrusion ports in nozzle portions 50 and 52 can be utilized to create different shaped extrudate ropes. Pumps 56a and 56b individually meter the same flow for each nozzle cap 42 regardless of downstream pressure and from a common source. However, pumps 56a and 56b can be driven to pump first and second foods at different pressures and flow rates from each other and/or during the creation of a food item intended to be a single service (for consumption by a single child in a single setting). Likewise, the speed of the conveyor onto which the extrudate ropes are extruded can be varied relative to apparatus 10 during the creation of a single service food item to form, for example, pieces of a high degree of variation to increase visual novelty and appeal. Further, nozzle caps 42 according to the teachings of the present invention can be rotated at differing rates during the fabrication of a single service food item. In particular, nozzle caps 42 could be rotationally stationary to create a bundle of parallel extrudate ropes. Furthermore, nozzle caps 42 could be rotated in the same direction to create a spiraled bundle of parallel extrudate ropes, with rotation being constant or at variable rates ranging from 0 to 1,000 rpms and in the preferred form in the order of 100 to 200 RPMS during the fabrication of a single service food item. Likewise, nozzle caps 42 could be rotated in reciprocal directions. It should be appreciated that a single service food item could be fabricated utilizing different techniques. As an example, nozzle caps 42 could be initially rotationally stationary, then rotate in a clockwise direction, then rotate in a counterclockwise direction, and finally being rotationally stationary again during the creation of a single service food item. Furthermore, the speed of the conveyor, the pump flow rates, and the like could also be varied at the same time that rotational speed and direction of nozzle caps 42 are being varied. It can be appreciated that the number of different single service food items which can be created is limited only by the imagination of the operator of apparatus 10 according to the teachings of the present invention. In a preferred form, the extradite ropes are in a form of a helical coil having a pitch value ranging from about 0.4 inch to about 3.5 inch.

Further, it should be appreciated that apparatus 10 according to the teachings of the present invention is relatively easy to clean and maintain. In particular, nozzle caps 42 can be removed by simply pushing in and rotating relative to gears 26 for cleaning, maintenance and changeover. Feed stems 22 can be slid from manifold 12 by removal of mounting plate 62 and any other securement. Pumps 56a and 56b can be removed from manifold 12 for cleaning and maintenance. Manifold 12 and the remaining components secured thereto typically can be cleaned and maintained in situ according to well known techniques.

Apparatus 10 according to its most preferred form of the present invention has particular utility in the ability to extrude fruit-based material rather than molding or embossing such material. In addition to the ease of changeover and cleaning previously discussed, apparatus 10 is less subject to wear and tolerance maintenance than prior fabrication techniques. In particular, manifold 12 including conduits 58 and 64, pumps 56a and 56b capable of high pressure and temperatures and their direct mounting on manifold 12, and the like allows apparatus 10 according to the preferred form to have a pressure capability of 1000 psi or more. Thus, apparatus 10 is able to extrude food-based material having high viscosity in the order of 1,000,000 CP at elevated temperatures in the order of 120° to 212° F. (49° to 100° C.) though extrusion ports in nozzle portions 50 and 52 having sizes in the order of 2 to 3 millimeters, with conventional food extrusion fabrication equipment not being sufficient to do so.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Coextrusion apparatus comprising, in combination: a manifold having a front face, a rear face, and at least one through passage extending from the rear face to the front face; a feed stem slideably received in the at least one through passage, with the feed stem including a sealing portion of a size and shape corresponding to and for slideable and sealing receipt in the at least one through passage, with the feed stem further including a feed portion extending from the sealing portion and of a size less than the at least one through passage; a central bore extending through the feed stem; a passageway defined radially between the feed portion and the at least one through passage; a nozzle closing the central bore and the passageway, with the nozzle including a first nozzle portion in communication with the central bore but not with the passageway, with the nozzle including a second nozzle portion in communication with the passageway but not with the central bore; and a power source including a rotatable shaft drivingly connected to said nozzle through a series of directly interengaged gears, wherein operation of the power source causes rotation of said nozzle.

2. The coextrusion apparatus of claim 1 with the at least one through passage including a counterbore extending from the rear face and of a size larger than the sealing portion; and with the feed stem including an end portion of a size and shape for slideable receipt in the counterbore, with the sealing portion located intermediate the end portion and the feed portion.

3. The coextrusion apparatus of claim 2 with the passageway being concentric to the central bore, with the central bore having circular cross sections.

4. The coextrusion apparatus of claim 3 with the nozzle being rotatable relative to the manifold and to the passageway.

5. The coextrusion apparatus of claim 4 further comprising, in combination: an outer stem secured to the front face of the manifold, with the outer stem having a central conduit of a size and shape corresponding to the at least one through passage, with the nozzle rotatably mounted on the outer stem, with the feed portion extending through the outer stem to the nozzle, with the passageway further defined between the feed portion and the central conduit.

6. The coextrusion apparatus of claim 5 further comprising, in combination: a drive element rotatably mounted upon the outer stem, with the nozzle mounted upon the drive element, with the drive element being rotated to rotate in different directions and at different speeds.

7. The coextrusion apparatus of claim 6 with the nozzle being removably mounted to the drive element, with at least one lug extending from one of the drive element and the nozzle, and with an L-shaped slot slideably receiving the at least one lug extending from a free end of the other of the drive element and the nozzle, with the L-shaped slot including an axially extending portion extending from the free end and interconnecting at an interconnection with a circumferentially extending portion.

8. The coextrusion apparatus of claim 7 with the L-shaped slot including an axially extending obtrusion provided at the interconnection and adjacent the free end, with the nozzle being biased away from the drive element.

9. The coextrusion apparatus of claim 8 with the nozzle being biased away from the drive element by an O-ring abutting with the free end and the one of the drive element and the nozzle.

10. Extrusion apparatus comprising, in combination: a manifold having a front face, a rear face, and at least one passage extending to the front face; a nozzle closing the at least one passage; and a drive element rotatably mounted relative to the manifold with the at least one passage extending therethrough, with the nozzle being removably mounted to the drive element, with at least one lug extending from one of the drive element and the nozzle, and with an L-shaped slot slideably receiving the at least one lug extending from a free end of the other of the drive element and the nozzle, with the L-shaped slot including an axially extending portion extending from the free end and interconnecting at an interconnection with a circumferentially extending portion.

11. The extrusion apparatus of claim 10 with the L-shaped slot including an axially extending obtrusion provided at the interconnection and adjacent the free end, with the nozzle being biased away from the drive element.

12. The extrusion apparatus of claim 11 with the nozzle being biased away from the drive element by an O-ring abutting with the free end and the one of the drive element and the nozzle.

13. The extrusion apparatus of claim 10 further comprising, in combination: an outer stem secured to the front face of the manifold, with the outer stem having a central conduit of a size and shape corresponding to the at least one passage, with the drive element rotatably mounted on the outer stem.

14. Extrusion apparatus comprising, in combination: a manifold having a front face, a rear face, and multiple passages extending to the front face, with each of the passages including an outer stem secured to the front face of the manifold, with the outer stem having a central conduit of a size and shape corresponding to the passage, a drive element rotatably mounted upon the outer stem, and a nozzle mounted upon the drive element and closing the central conduit; and a rotatable power source including a rotatable shaft, with the drive elements of the multiple passages being in driving relation with the rotatable shaft, wherein the drive element is in the form of a gear, with the drive elements of the multiple passages and of the rotatable shaft being in direct interengaging gearing relation and wherein the rotatable power source rotates the rotatable shaft in different directions and at different speeds.

15. The coextrusion apparatus of claim 1 wherein the manifold includes multiple through passages extending from the rear face to the front face, with each said through passage including a respective said nozzle.

16. The coextrusion apparatus of claim 15 wherein operation of the power source causes rotation of each said nozzle.

17. The coextrusion apparatus of claim 16 wherein the series of directly interengaged gears drivingly interconnects each said nozzle with the rotatable shaft.

* * * * *